United States Patent
Yamamoto et al.

(10) Patent No.: US 9,635,322 B2
(45) Date of Patent: Apr. 25, 2017

(54) VIDEO INTERCOM DEVICE

(71) Applicant: PANASONIC INTELLECTUAL PROPERTY MANAGEMENT CO., LTD., Osaka (JP)

(72) Inventors: Takashi Yamamoto, Fukuoka (JP); Shinji Fukuda, Fukuoka (JP); Ken Ohbuchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/989,909

(22) Filed: Jan. 7, 2016

(65) Prior Publication Data

US 2016/0295174 A1 Oct. 6, 2016

(30) Foreign Application Priority Data

Apr. 1, 2015 (JP) ................................. 2015-075065

(51) Int. Cl.
  *H04N 7/14* (2006.01)
  *H04N 7/18* (2006.01)
  (Continued)

(52) U.S. Cl.
  CPC .............. *H04N 7/186* (2013.01); *H04M 9/08* (2013.01); *H04N 7/147* (2013.01); *H04N 7/148* (2013.01); *H04W 52/02* (2013.01)

(58) Field of Classification Search
  None
  See application file for complete search history.

(56) References Cited

U.S. PATENT DOCUMENTS

2002/0176556 A1* 11/2002 Sumiya ............. H04L 12/40032
  379/167.01
2003/0174049 A1* 9/2003 Beigel ................ G06K 19/0716
  340/10.42

(Continued)

FOREIGN PATENT DOCUMENTS

| EP | 2602945 | 6/2013 |
|---|---|---|
| JP | 2008-252271 | 10/2008 |
| JP | 2010-259015 | 11/2010 |

OTHER PUBLICATIONS

U.S. Appl. No. 14/989,912 to Takashi Yamamoto et al., filed Jan. 7, 2016.

(Continued)

*Primary Examiner* — Maria El-Zoobi
(74) *Attorney, Agent, or Firm* — Greenblum & Bernstein, P.L.C.

(57) ABSTRACT

Provided is a video intercom device suppressing electric power consumption. The video intercom device adopts a configuration where the video intercom device performs wireless communication between a front door slave unit and an indoor master unit, the indoor master unit includes a wireless communication unit that requests the front door slave unit to be switched between a first communication method by which the front door slave unit periodically turns on a main power source and is in a sleep state when the main power source turns off, and a second communication method by which the front door slave unit turns on the main power source when an interrupt occurs and is in the sleep state when the main power source turns off, and the front door slave unit includes a controller that controls switching to a communication method requested from the indoor master unit.

6 Claims, 8 Drawing Sheets

(51) Int. Cl.
*H04W 52/02* (2009.01)
*H04M 9/08* (2006.01)

(56) References Cited

U.S. PATENT DOCUMENTS

| | | | |
|---|---|---|---|
| 2008/0136908 A1* | 6/2008 | Carter | H04M 11/025 348/143 |
| 2012/0250610 A1* | 10/2012 | Budampati | H04L 67/125 370/328 |
| 2014/0099944 A1* | 4/2014 | Zisimopoulos | H04W 88/06 455/426.1 |
| 2016/0088553 A1 | 3/2016 | Hirai et al. | |

OTHER PUBLICATIONS

The Extended European Search Report dated Aug. 16, 2016 for European Patent Application No. 15199635.2.

* cited by examiner

VIDEO INTERCOM DEVICE

BACKGROUND OF THE INVENTION

1. Field of the Invention

The present invention relates to a video intercom device.

2. Description of the Related Art

In recent years, awareness of crime prevention has increased year by year, and requests have increased to realize front door slave units or the like with low cost and easy installation in a single household such as one-room apartments or the like as well as detached houses.

So as to meet the request of the easy installation at such a low cost, a technique is becoming popular where wiring work between devices is unnecessary by using wireless communication. For example, in Japanese Patent Unexamined Publication No. 2008-252271, a television intercom device provided with a front door slave unit and a wireless master unit that wirelessly communicates with the front door slave unit is disclosed.

SUMMARY OF THE INVENTION

A video intercom device according to an aspect of the disclosure including a front door slave unit; and an indoor master unit that performs wireless communication with the front door slave unit, the indoor master unit includes a wireless communication unit that requests the front door slave unit to be switched between a first communication method by which the front door slave unit periodically turns on a main power source and is in a sleep state when the main power source turns off, and a second communication method by which the front door slave unit turns on the main power source when an interrupt occurs and is in the sleep state when the main power source turns off, and the front door slave unit includes a controller that controls switching to a communication method requested from the indoor master unit.

According to the present disclosure, it is possible to suppress electric power consumption.

DETAILED DESCRIPTION OF THE PREFERRED EMBODIMENT

Before the description of the embodiment of the present invention, problems of the related art will be simply described. It is preferable to suppress electric power consumption so as to save effort such as replacement of a battery or charging of the battery when a front door slave unit or a radio master unit is driven by the battery.

An object of the present invention is to provide a video intercom device suppressing electric power consumption.

Hereinafter, an embodiment of the present invention will be described in detail with reference to the drawings.

Embodiment

Figure 1:
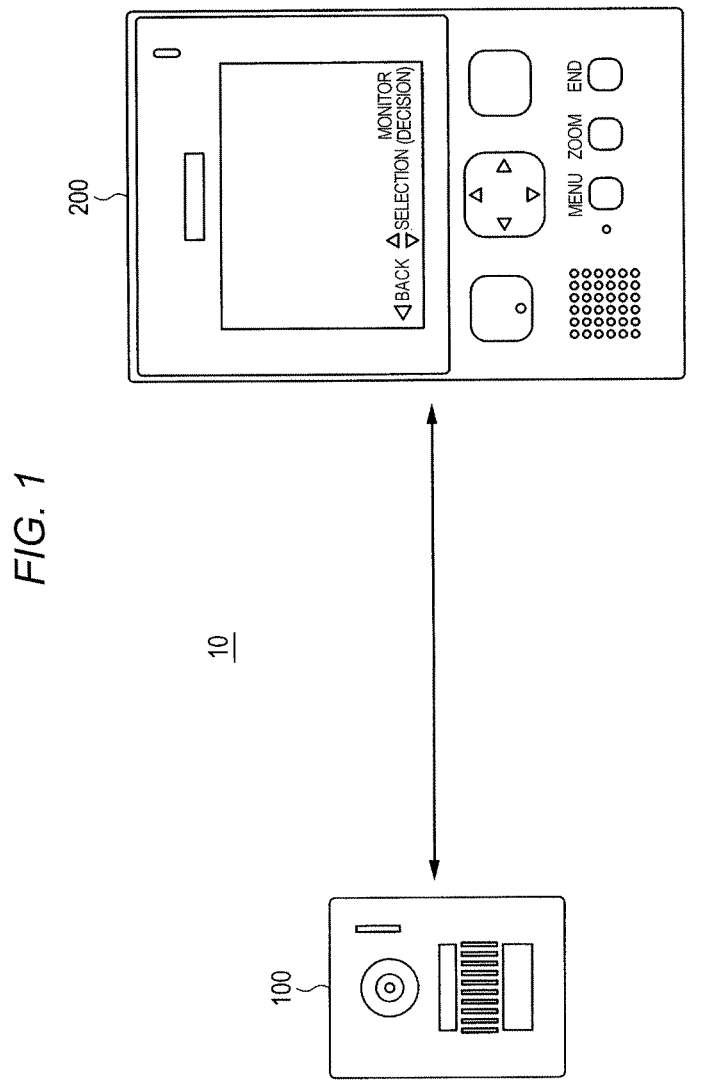
FIG. 1 is a diagram illustrating a video intercom device according to an embodiment.

FIG. 1 is a diagram illustrating video intercom device 10 according to an embodiment of the present invention. As illustrated in FIG. 1, video intercom device 10 includes front door slave unit 100 and indoor master unit 200.

Figure 2:
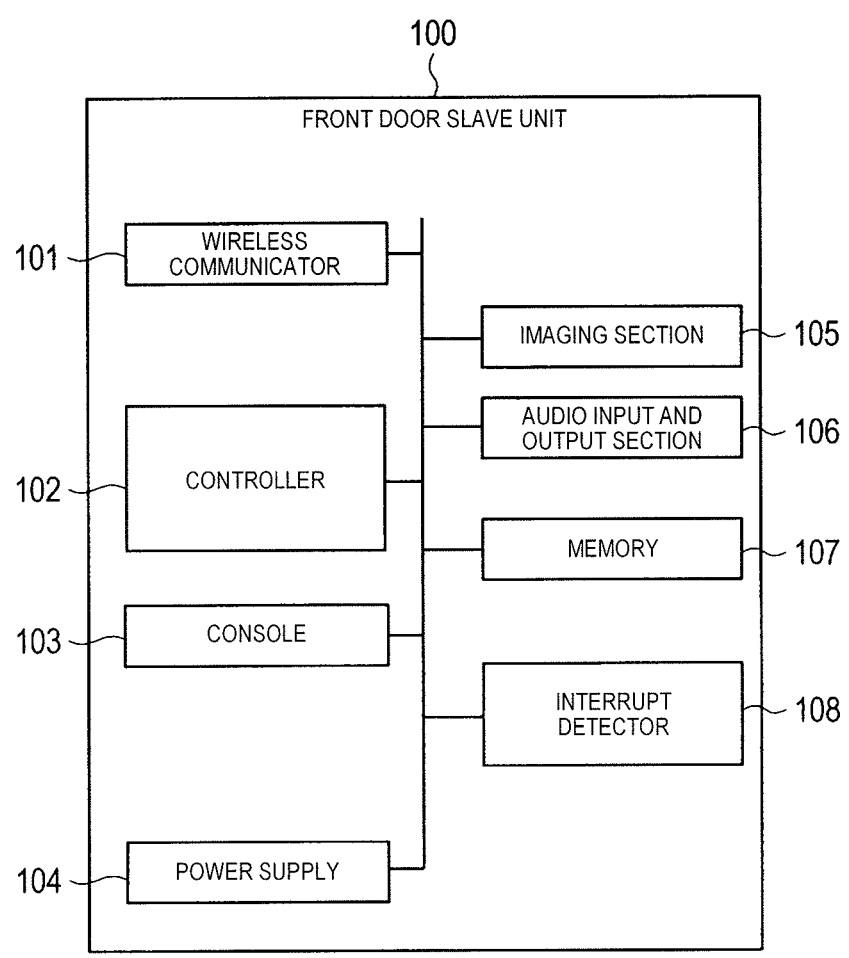
FIG. 2 is a block diagram illustrating a configuration example of a front door slave unit according to an embodiment.

FIG. 2 is a block diagram illustrating a configuration example of front door slave unit 100 according to the embodiment of the present invention.

Configuration of Front Door Slave Unit

Front door slave unit 100 includes wireless communicator 101, controller 102, console 103, power supply 104, imaging section 105, audio input and output section 106, memory 107, and interrupt detector 108.

Wireless communicator 101 communicates with indoor master unit 200 through a radio channel. A communication method of wireless communicator 101, for example, includes Digital Enhanced Cordless Telecommunications (DECT), wireless local area network (LAN), and ZigBee (registered trademark).

Wireless communicator 101 transmits a captured image to indoor master unit 200. With this, indoor residents can recognize the visitors present in the vicinity of the entrance door. In addition, wireless communicator 101 transmits voice information including a voice of the visitors that is collected by audio input and output section 106 of front door slave unit 100 to indoor master unit 200. In addition, wireless communicator 101 receives voice information including the voice of residents from indoor master unit 200. With this, it is possible to make a phone call between an outdoor visitor and an indoor resident.

Controller 102 includes a read only memory (ROM), a random access memory (RAM), a central processing unit (CPU), or the like. For example, the CPU realizes various functions of controller 102 by executing a program stored in the ROM.

Controller 102 controls the entirety of front door slave unit 100, and performs various kinds of control, calculation, and determination. Controller 102 performs calculation processing for controlling each section of front door slave unit 100.

Console 103, for example, is a call button. The presence of the visitor is notified to indoor master unit 200 through wireless communicator 101 when the call button is pressed by the visitors.

Power supply 104 provides electric power for driving front door slave unit 100 to respective sections. Power supply 104 is configured with batteries such as primary batteries, rechargeable batteries, or the like in view of the installation. However, power supply 104 is not limited thereto. The electric power may be input from an AC power source or an AC adapter.

Imaging section 105 captures a predetermined area outdoors. An image (captured image) captured by imaging section 105, for example, includes video and still images, and the captured image includes image of visitors, passersby, suspicious persons, objects other than a human, or the like.

Audio input and output section 106 is a microphone, a speaker, or the like, collects voice information including the sound of the visitors, and transmits information to indoor master unit 200 through wireless communicator 101. In addition, audio input and output section 106 outputs voice information including the voice of residents which is transmitted from indoor master unit 200.

Memory 107 is configured with a flash memory or the like, and for example stores device information of an identification number or the like of front door slave unit 100, setting information, state information of indoor master unit 200, a captured image before transmission to indoor master unit 200, or the like.

Interrupt detector 108 detects a key interrupt caused from a button or the like of front door slave unit 100, an interrupt caused from a timer, and an interrupt caused from various events. The detection of the interrupt includes detection of an interrupt caused from hardware or software.

Interrupt detector 108 also has a function for controlling electric power supply to each section by power supply 104 so as to realize ultra low electric power consumption. For example, interrupt detector 108 is disposed between respective sections such as power supply 104, controller 102, or the like, on circuits and only interrupt detector 108 is driven by weak electric power from power supply 104 at all times. Accordingly, interrupt detector 108 turns on or off a switching element for supplying electric power to each section based on the detection of a predetermined interrupt.

Configuration of Indoor Master Unit

Figure 3:
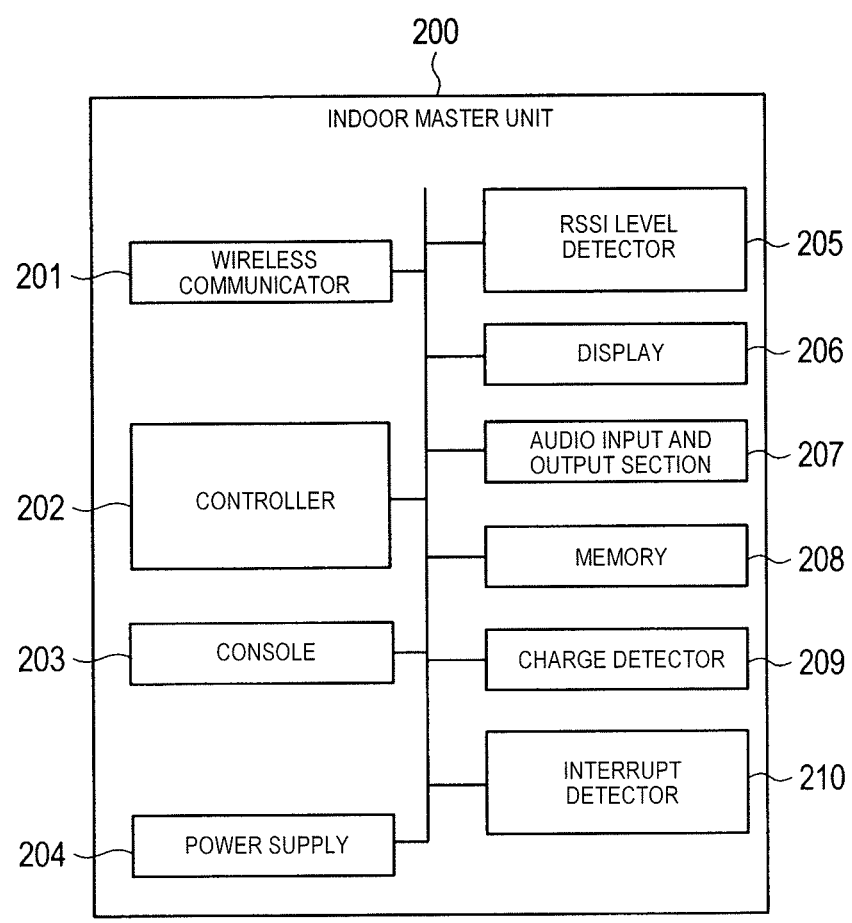
FIG. 3 is a block diagram illustrating a configuration example of an indoor master unit according to an embodiment.

FIG. 3 is a block diagram illustrating a configuration example of indoor master unit 200 according to an embodiment of the present invention.

Indoor master unit 200 includes wireless communicator 201, controller 202, console 203, power supply 204, RSSI level detector 205, display 206, voice input and output section 207, memory 208, charge detector 209, and interrupt detector 210.

Wireless communicator 201 communicates with front door slave unit 100 through a radio channel. A communication method of wireless communicator 201, for example, includes DECT, wireless LAN, or ZigBee (registered trademark).

Wireless communicator 201 receives a captured image from front door slave unit 100. With this, indoor residents can recognize the visitors present in the vicinity of the entrance door. In addition, wireless communicator 201 receives voice information including the voice of the visitors from front door slave unit 100. In addition, wireless communicator 201 transmits voice information including a voice of the residents that is collected by voice input and output section 207 of indoor master unit 200 to front door slave unit 100. With this, it is possible to make a phone call between an outdoor visitor and an indoor resident.

Controller 202 includes a ROM, a RAM, a CPU, or the like. For example, the CPU realizes various functions of controller 202 by executing a program stored in the ROM.

Controller 202 controls the entirety of indoor master unit 200, and performs various kinds of control, calculation, and determination. Controller 202 performs calculation processing for controlling each section of indoor master unit 200.

Console 203 includes various buttons such as a response button for responding to a case where the presence of the visitor is notified from front door slave unit 100, a monitor button for acquiring a captured image from front door slave unit 100, a button for controlling front door slave unit 100, or the like.

Power supply 204 supplies electric power for driving indoor master unit 200 to respective sections. Power supply 204 may be applied in a case where the electric power is input from an AC power source or an AC adapter and a case where the power supply is configured with batteries such as primary batteries, rechargeable batteries, or the like in view of the installation.

RSSI level detector 205 detects strength, that is, a received signal strength indicator (RSSI) level of a signal that is received from front door slave unit 100 to wireless communicator 201.

Display 206, for example, includes a liquid crystal display (LCD), and displays various characters or images. The images, for example, include video and still images, a captured image from front door slave unit 100, and images for operating indoor master unit 200.

Voice input and output section 207 is a microphone, a speaker, or the like, collects voice information including the sound of the residents, and transmits information to front door slave unit 100 through wireless communicator 201. In addition, voice input and output section 207 outputs voice information including the voice of residents which is transmitted from front door slave unit 100.

Memory 208 is configured with a flash memory or the like, for example, and includes various images or voice, and other management information. The images, for example, include video and still images, captured images from front door slave unit 100, and images for operating indoor master unit 200. The voice, for example, includes a voice of a fixed form message generated from indoor master unit 200.

The other management information, for example, includes password information so as to not arbitrarily change various setting information of indoor master unit 200.

Charge detector 209 detects whether or not indoor master unit 200 is mounted on a charging stand or the like and power supply 204 is connected to an external power source.

Interrupt detector 210 detects a key interrupt caused from a button or the like of indoor master unit 200, an interrupt caused from a timer, and an interrupt caused from various events. The detection of the interrupt includes detection of an interrupt caused from hardware or software.

Interrupt detector 210 has also a function for controlling electric power supply to each section by power supply 204 so as to realize ultra low electric power consumption. For example, interrupt detector 210 is disposed between respective sections such as power supply 204, controller 202, or the like, on circuits and only interrupt detector 210 is driven by weak electric power from power supply 204 at all times. Accordingly, interrupt detector 210 turns on or off a switching element for supplying the electric power to each section based on the detection of a predetermined interrupt.

Communication Method

Next, a communication method in video intercom device 10 described above will be described.

In a first communication method, front door slave unit 100 periodically turns on a main power source (for example, every 1.28 seconds), and only a minimum circuit block for selecting the main power source is in a state (hereinafter, referred to as "sleep state") of being biased with ultra low current consumption when the main power source turns off. In this communication method, it is possible to make a wireless connection between front door slave unit 100 and indoor master unit 200, and to make a phone call between an outdoor visitor and an indoor resident, by pressing the call button of front door slave unit 100 or a monitor button of indoor master unit 200.

In a second communication method, front door slave unit 100 turns on the main power source at a time at which an interrupt occurs, and is in the sleep state at a time at which the main power source turns off. For this reason, it is possible to suppress the electric power consumption in the second communication method compared to the first communication method. In the following description, the second communication method is also referred to as an "energy-saving mode". In this communication method, it is possible to make a wireless connection between front door slave unit 100 and indoor master unit 200, and to make a phone call between an outdoor visitor and an indoor resident, by pressing the call button of front door slave unit 100. In addition, in this communication method, it is difficult to make a wireless connection between front door slave unit 100 and indoor master unit 200 even when the monitor button of indoor master unit 200 is pressed.

Switching of Communication Method

Figure 4:
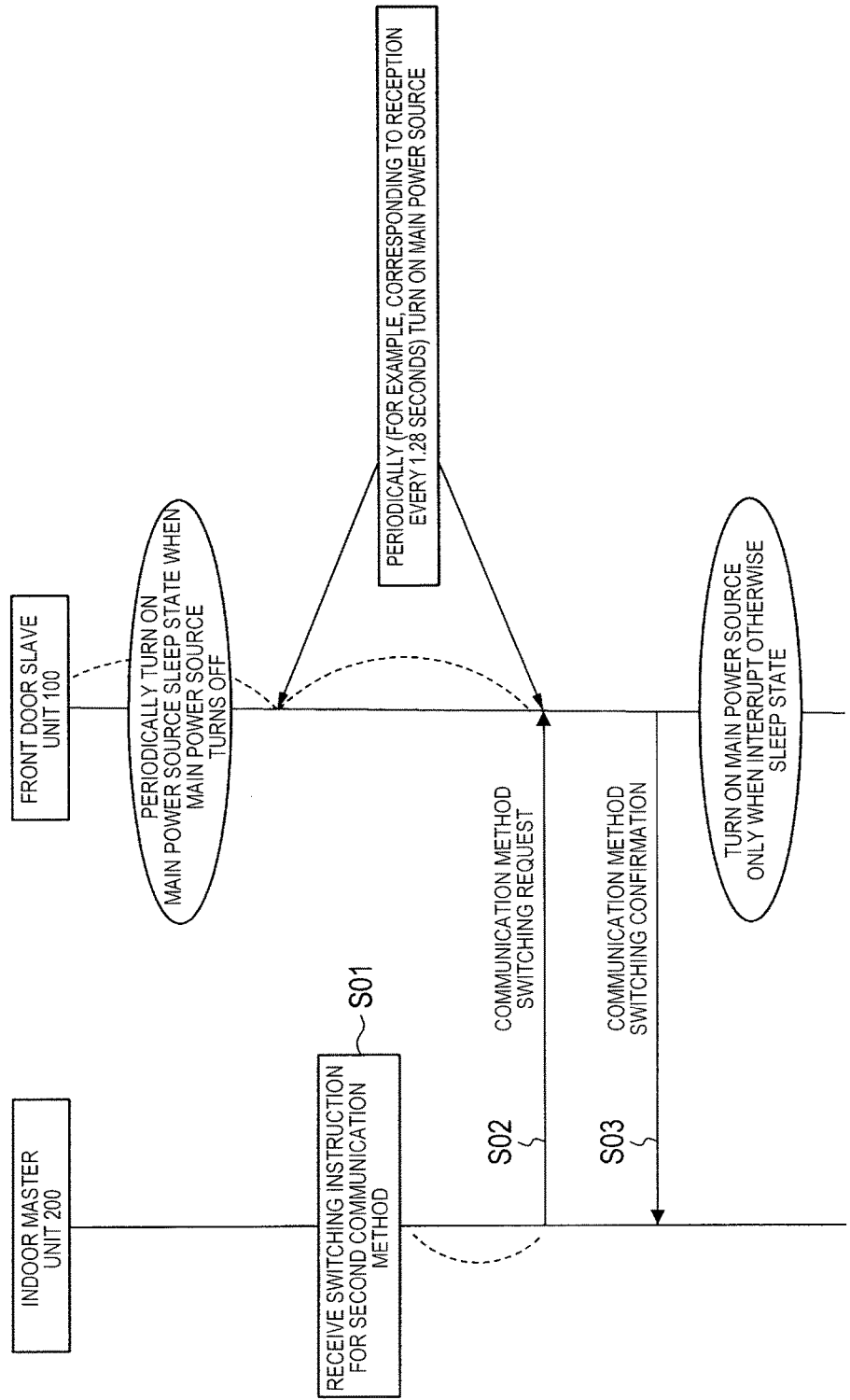
FIG. 4 is a sequence diagram illustrating a procedure for switching from a first communication method to a second communication method.

FIG. 4 is a sequence diagram illustrating a procedure for switching from a first communication method to a second communication method. In step S01, indoor master unit 200 receives a switching instruction for the second communication from a resident, and in step S02, transmits a communication method switching request to front door slave unit 100 at a timing at which front door slave unit 100 starts.

In step S03, front door slave unit 100 transmits a switching confirmation for the second communication method to indoor master unit 200, and is switched to the second communication method.

Figure 5:
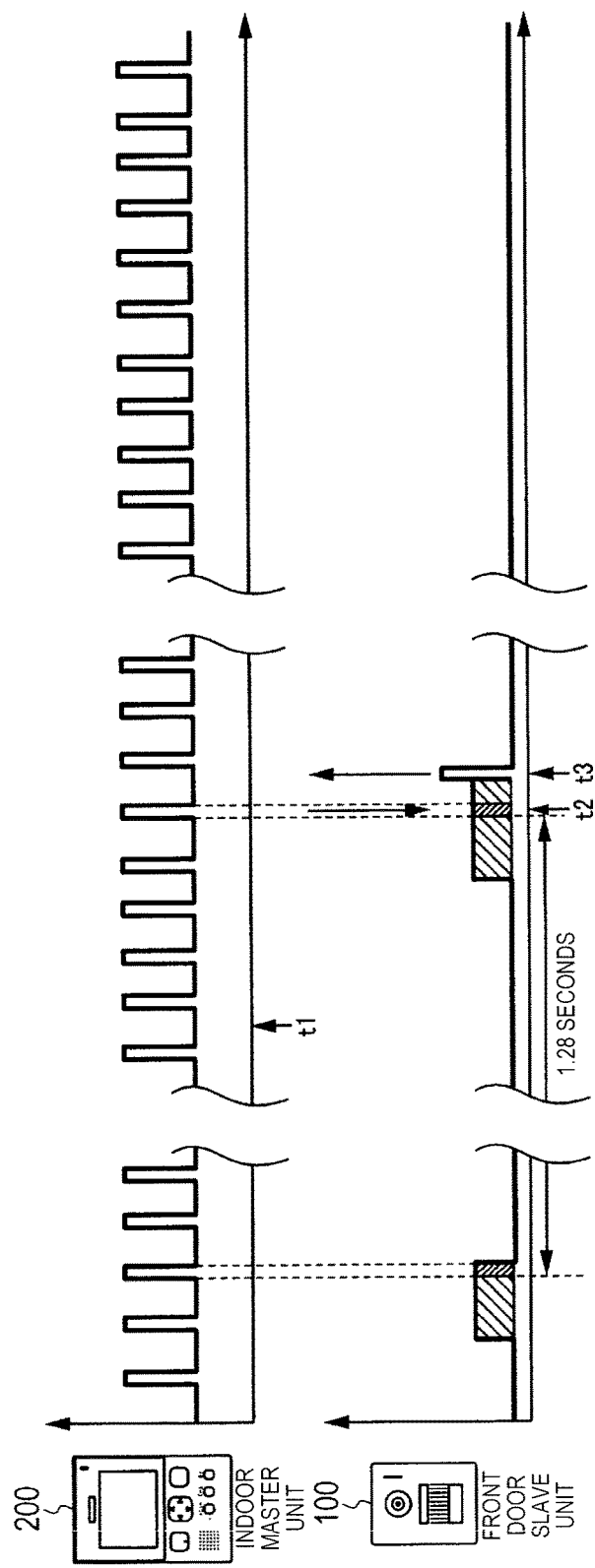
FIG. 5 is a diagram illustrating a state of change of current consumption in the front door slave unit and the indoor master unit.

FIG. 5 is a diagram illustrating a state of change of current consumption in front door slave unit 100 and indoor master unit 200. As can be known from the figure, indoor master unit 200, for example, performs synchronization output every 10 ms. In this time, indoor master unit 200 receives a switching instruction for the second communication method at time t1.

Meanwhile, in the first communication method, front door slave unit 100, for example, periodically turns on the main power source in accordance with a regular reception every 1.28 seconds. Front door slave unit 100 transmits a communication method switching confirmation to indoor master unit 200 at time t3 at which front door slave unit 100 receives the switching instruction for the second communication method from indoor master unit 200 at time t2 during a timing at which the main power source turns on, and thus the front door slave unit 100 is switched to the second communication method.

Figure 6:
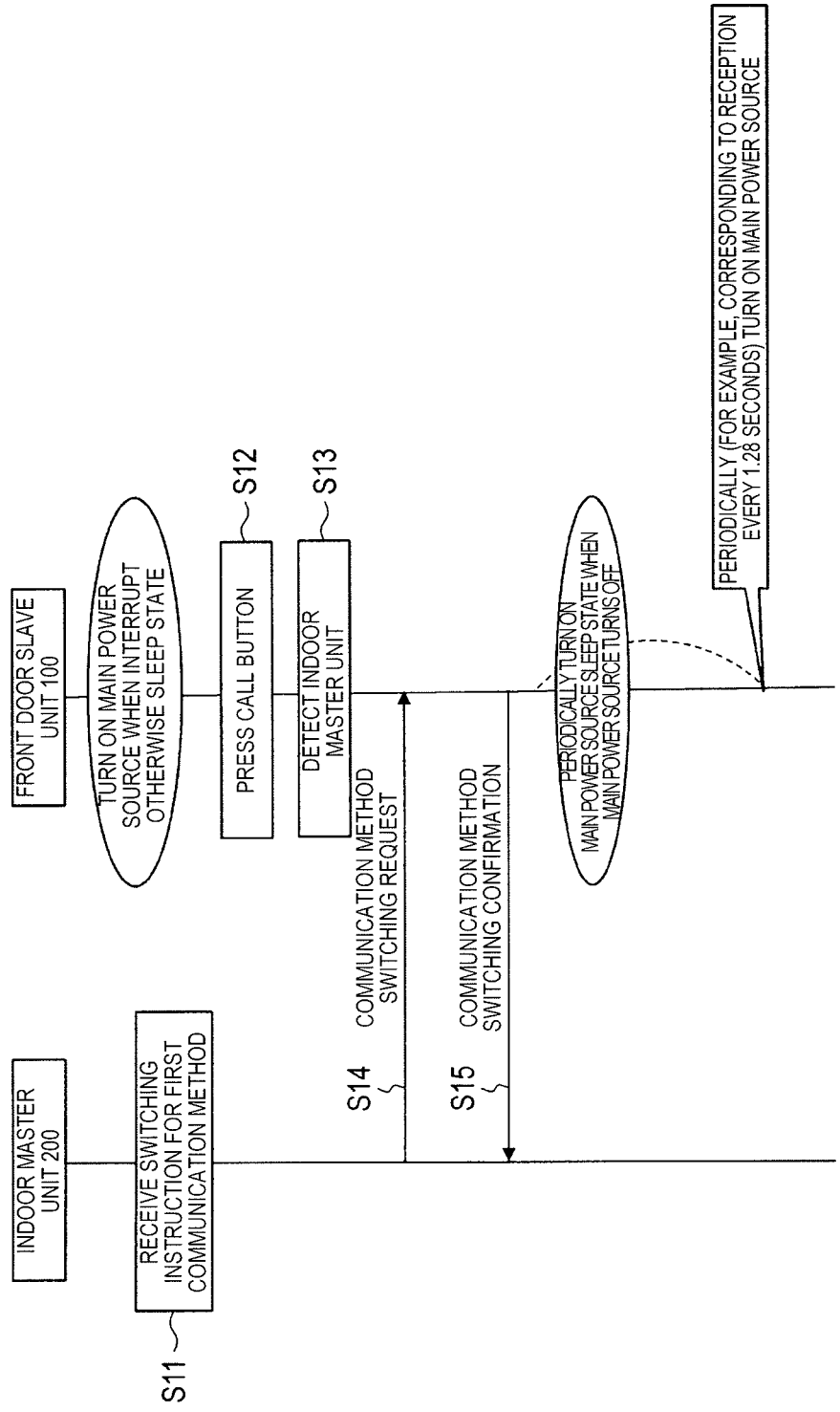
FIG. 6 is a sequence diagram illustrating a procedure for switching from the second communication method to the first communication method.

FIG. 6 is a sequence diagram illustrating a procedure for switching from the second communication method to the first communication method. In step S11, indoor master unit 200 receives a switching instruction for the first communication method. Then, in step S12, the call button of front door slave unit 100 is pressed, and in step S13, front door slave unit 100 detects indoor master unit 200.

In step S14, indoor master unit 200 transmits a communication method switching request to front door slave unit 100, and in step S15, front door slave unit 100 transmits a switching confirmation for the first communication method to indoor master unit 200, and is switched to the first communication method.

Figure 7:
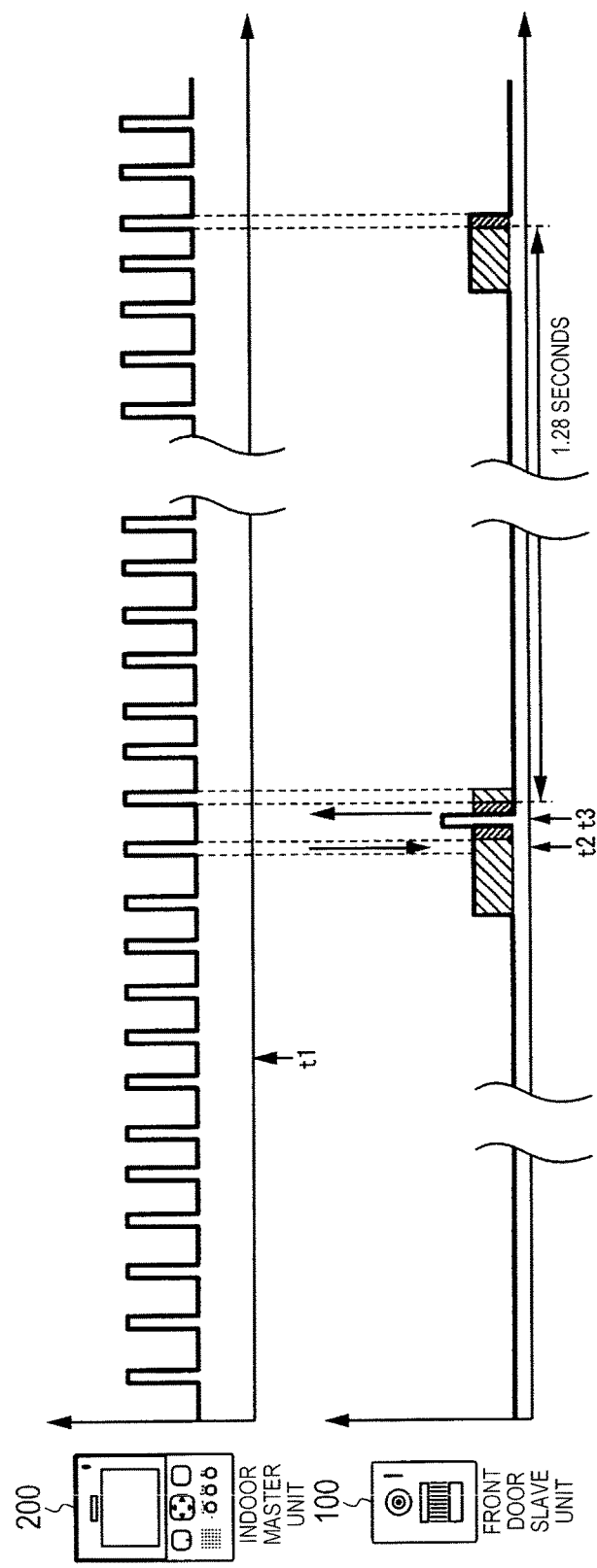
FIG. 7 is a diagram illustrating a state of change of current consumption in the front door slave unit and the indoor master unit.

FIG. 7 is a diagram illustrating a state of change of current consumption in front door slave unit 100 and indoor master unit 200. As can be known from the figure, indoor master unit 200, for example, performs synchronization output every 10 ms. In this time, indoor master unit 200 receives a switching instruction for the first communication method at time t1.

Meanwhile, in the second communication method, front door slave unit 100, for example, turns on the main power source at a timing at which the call button is pressed, receives a switching instruction for the first communication method from indoor master unit 200 at time t2, transmits a communication method switching confirmation to indoor master unit 200 at time t3, and then is switched to the first communication method.

Figure 8:
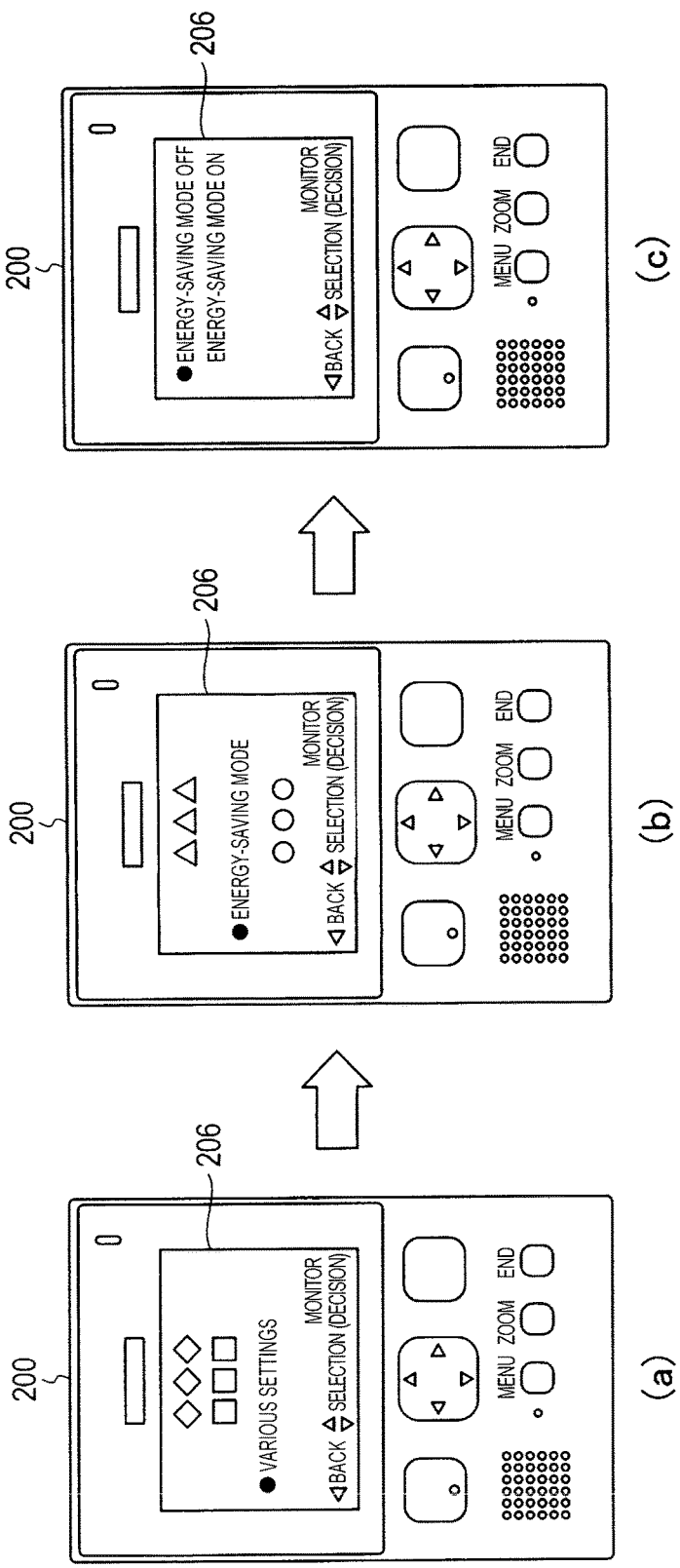
FIG. 8 shows diagrams illustrating an example of a setting screen of the indoor master unit.

FIG. 8 shows diagrams illustrating an example of a setting screen of the indoor master unit 200. A resident presses a menu button or a selection button, selects "various settings" that are displayed on display 206 as illustrated in (a) in FIG. 8, and decides a setting by pressing a decision button.

A resident presses the selection button, selects an "energy-saving mode" that is displayed on display 206 as illustrated in (b) in FIG. 8, and decides the mode by pressing the decision button.

A resident presses the selection button, selects an "energy-saving mode OFF (corresponding to the first communication method)" or an "energy-saving mode ON (corresponding to the second communication method)" that is displayed on display 206 as illustrated in (c) in FIG. 8, and decides the mode by pressing the decision button. In addition, an initial setting is the "energy-saving mode ON".

In this way, in video intercom device 10 according to the present embodiment, front door slave unit 100 periodically turns on the main power source, and is switched between the first communication method by which the front door slave unit is in the sleep state when the main power source turns off, and the second communication method by which front door slave unit 100 turns on the main power source when an interrupt occurs and the front door slave unit is in the sleep state when the main power source turns off. With this, it is possible to suppress electric power consumption of front door slave unit 100.

In the present embodiment, there is a description that the main power supply turns on at all times such that the indoor master unit performs synchronization output every 10 ms. However, this invention is not limited thereto. For example, it is possible that the main power source of the indoor master unit turns off and the front door slave unit is in the sleep state by using a communication method disclosed in Japanese Patent Application No. 2014-190991. Accordingly, it is also possible to suppress electric power consumption of the indoor master unit.

The video intercom device according to the present invention is useful for suppressing the electric power consumption.

What is claimed is:

1. A video intercom device that performs a wireless communication between a front door slave device and an indoor master device,
    wherein the indoor master device includes
    a wireless transmitter that requests the front door slave device to be switched between a first communication method and a second communication method,
    wherein, in the first communication method, a main power source included in the front door slave device, periodically turns on and turns off while the front door slave device is in a sleep state, and in the second communication method, the front door slave device in the sleep state turns on the main power source when an interrupt signal is detected at the front door device,
    wherein the front door slave device includes a processor that controls switching the front door slave device to one of the first or second communication method requested from the indoor master device, and wherein, in the first communication method, a period between the turning on and off of the main power source is greater than 1 second.

2. The video intercom device of claim 1,
wherein the indoor master device requests switching from the first communication method to the second communication method at a timing at which the main power source of the front door slave device turns on.

3. The video intercom device of claim 1,
wherein the indoor master device requests switching from the second communication method to the first communication method at a timing at which the front door slave device turns on the main power source in response to detecting the interrupt signal.

4. The video intercom device of claim 1,
wherein the front door slave device in the second communication method detects the interrupt signal when a physical input is detected on the front door slave device.

5. The video intercom device of claim 1,
wherein an auxiliary power source of the front door slave device remains on in the second communication method to detect the interrupt signal.

6. A video intercom device that performs a wireless communication between a front door slave device and an indoor master device, wherein the indoor master device includes a wireless transmitter that requests the front door slave device to be switched between a first communication method and a second communication method, wherein, in the first communication method, a main power source included in the front door slave device, periodically turns on and turns off while a, the front door slave device is in a sleep state, and in the second communication method, the front door slave device in the sleep state turns on the main power source when an interrupt signal is detected at the front door device, wherein the front door slave device includes a processor that controls switching the front door slave device to one of the first or second communication method requested from the indoor master device, and wherein, in the first communication method, a period between the turning on and off of the main power source is less than 2 seconds.

* * * * *